United States Patent
Zheng et al.

(10) Patent No.: US 11,450,333 B2
(45) Date of Patent: Sep. 20, 2022

(54) SOUND INSULATION METHOD AND DEVICE AND SYSTEM THEREOF BASED ON LIFI OPTICAL COMMUNICATION

(71) Applicant: INVENTEC APPLIANCES CORP., New Taipei (TW)

(72) Inventors: Yong-Ping Zheng, Shanghai (CN); Shih-Kuang Tsai, Shanghai (CN)

(73) Assignee: INVENTEC APPLIANCES CORP., New Taipei (TW)

( * ) Notice: Subject to any disclaimer, the term of this patent is extended or adjusted under 35 U.S.C. 154(b) by 224 days.

(21) Appl. No.: 16/917,980

(22) Filed: Jul. 1, 2020

(65) Prior Publication Data

US 2021/0005214 A1    Jan. 7, 2021

(30) Foreign Application Priority Data

Jul. 4, 2019    (CN) .......................... 201910607790.2

(51) Int. Cl.
*G10L 21/0208* (2013.01)
*H04B 10/114* (2013.01)
*H04W 4/021* (2018.01)
*G06V 20/40* (2022.01)

(52) U.S. Cl.
CPC .......... *G10L 21/0208* (2013.01); *G06V 20/40* (2022.01); *H04B 10/114* (2013.01); *H04W 4/021* (2013.01)

(58) Field of Classification Search
CPC ... G02F 1/133605; G06V 20/40; G10L 17/00; G10L 17/02; G10L 17/22; G10L 2021/02087; G10L 21/0208; G10L 21/0272; G10L 15/02; H03G 3/32; H04B 10/114; H04B 10/116; H04B 3/54; H04B 10/1129; H04L 65/1089; H04L 63/0861; H04L 63/18; H04N 21/43615; H04W 4/021; H04W 4/06; H05B 47/19; H05B 47/16; H05B 47/195; F21K 9/69; F21S 41/24; F21V 29/51; G01S 3/80; G06F 3/167; G06F 21/32; G06K 19/0728;
(Continued)

(56) References Cited

U.S. PATENT DOCUMENTS

| 9,531,998 | B1 * | 12/2016 | Farrell | .................... G10L 15/02 |
| 9,924,286 | B1 * | 3/2018 | Milne | .................. H04B 10/116 |
| 10,193,627 | B1 * | 1/2019 | Herman | ............... H04B 10/116 |

(Continued)

*Primary Examiner* — Gerald Gauthier
(74) *Attorney, Agent, or Firm* — McClure, Qualey & Rodack, LLP (57) ABSTRACT

A sound insulation method and a device based on LiFi optical communication, electronic device, and a storage medium are provided. The sound insulation method based on LiFi optical communication includes: zoning a public area and a private area by a light through LiFi optical communication; collecting one or multiple sound sources; extracting a private voice data of one or multiple sound sources from the sound sources; obtaining a sound source location of a private voice data according to the identified voice data; filtering a private voice data whose sound source location is located in the private area from the sound sources; and performing voice communication according to the filtered sound sources. The invention realizes intelligent sound insulation in audio calls and/or video calls.

20 Claims, 9 Drawing Sheets

(58) Field of Classification Search
CPC .. G06Q 30/0613; G08B 25/001; G08B 25/14; G08G 1/207; G08G 1/22; H04M 3/568
USPC .......................... 250/208.2; 348/563; 704/226
See application file for complete search history.

(56) References Cited

U.S. PATENT DOCUMENTS

| | | | |
|---|---|---|---|
| 10,395,290 B1* | 8/2019 | Koo | G06Q 30/0613 |
| 10,429,051 B1* | 10/2019 | Tran | F21V 29/51 |
| 10,681,522 B1* | 6/2020 | Shintani | G08B 25/14 |
| 11,128,376 B1* | 9/2021 | Passe | H04W 12/082 |
| 11,355,135 B1* | 6/2022 | Ho | G10L 21/0364 |
| 2011/0063510 A1* | 3/2011 | Lee | G02F 1/133605 |
| | | | 348/E5.101 |
| 2013/0126713 A1* | 5/2013 | Haas | H04B 10/116 |
| | | | 250/208.2 |
| 2016/0281963 A1* | 9/2016 | Dussaume | H04B 10/116 |
| 2016/0308614 A1* | 10/2016 | Tsonev | H04B 10/116 |
| 2016/0337863 A1* | 11/2016 | Robinson | H04W 4/021 |
| 2017/0041886 A1* | 2/2017 | Baker | H04W 4/06 |
| 2017/0351946 A1* | 12/2017 | Jayawardena | G06K 19/0728 |
| 2018/0083701 A1* | 3/2018 | Tilaye | H04B 10/116 |
| 2018/0123689 A1* | 5/2018 | Chaudhuri | H04W 72/04 |
| 2018/0211665 A1* | 7/2018 | Park | G06F 3/167 |
| 2018/0262908 A1* | 9/2018 | Yeom | H04L 63/18 |
| 2018/0359366 A1* | 12/2018 | Moncomble | H04L 65/1089 |
| 2019/0028193 A1* | 1/2019 | Miras | H04B 10/1129 |
| 2019/0110181 A1* | 4/2019 | Kavantsaari | G08B 25/001 |
| 2019/0132453 A1* | 5/2019 | Liu | H03G 3/32 |
| 2019/0214019 A1* | 7/2019 | White | H05B 47/19 |
| 2019/0225220 A1* | 7/2019 | Laine | G08G 1/22 |
| 2019/0251975 A1* | 8/2019 | Choi | G06F 21/32 |
| 2019/0320219 A1* | 10/2019 | Yoden | H04N 21/43615 |
| 2019/0376653 A1* | 12/2019 | Dussaume | F21K 9/69 |
| 2020/0145824 A1* | 5/2020 | Jones, Jr. | H04B 3/54 |
| 2020/0153506 A1* | 5/2020 | Linnartz | H05B 47/195 |
| 2020/0162158 A1* | 5/2020 | Tran | H05B 47/16 |
| 2020/0220869 A1* | 7/2020 | Singh | H04L 63/0861 |
| 2020/0233292 A1* | 7/2020 | Rudy | F21S 41/24 |
| 2020/0242945 A1* | 7/2020 | Beaurepaire | G08G 1/207 |
| 2020/0252742 A1* | 8/2020 | Yeon | H04W 4/021 |
| 2020/0275541 A1* | 8/2020 | Sondericker, III | H05B 47/19 |
| 2020/0302721 A1* | 9/2020 | Koo | H04B 10/1149 |
| 2020/0366370 A1* | 11/2020 | Poulain | F21V 33/0052 |
| 2021/0005214 A1* | 1/2021 | Zheng | G06V 20/40 |
| 2021/0109419 A1* | 4/2021 | Galstian | G02F 1/13306 |
| 2021/0119743 A1* | 4/2021 | Van Wageningen | H04B 10/116 |
| 2022/0108521 A1* | 4/2022 | Sameer | G06T 15/60 |

* cited by examiner

SOUND INSULATION METHOD AND DEVICE AND SYSTEM THEREOF BASED ON LIFI OPTICAL COMMUNICATION

This application claims the benefit of People's Republic of China application Serial No. 201910607790.2, filed Jul. 4, 2019, the subject matter of which is incorporated herein by reference.

BACKGROUND OF THE INVENTION

Field of the Invention

The invention relates in general to an application field of LiFi (Light Fidelity) optical communication technology, and more particularly to a sound insulation method and a device and a system thereof based on LiFi optical communication.

Description of the Related Art

To resolve the problem that the ambient noises or non-participants' voices at the local end may be sent out in audio calls or video calls, current multi-party communication systems regardless of the audio calls or the video calls normally have a manual mute button configured in the audio calls or the video calls. Once the manual mute button is activated, all the audio sounds at the local end will be shielded, and the calls will be affected. Additionally, the manual mute button is not convenient to operate for multiple users, and may easily be voice leakage due to certain confidential matters to be discussed in the meeting and/or in private multiple users' conversation.

In some of the prior art, such as the Chinese Patent Application No. 107148782, an audio system with a configurable area is disclosed. Based on the location of the user, the audio source and/or the speaker array, the audio wave beam of the channel corresponding to the content of one or multiple voice programs can be outputted to an independent configurable area. The said application provides a solution for controlling the audio sound through the configurable area, and further resolves part of the above mentioned technical problems through the configurable area at the audio broadcasting end. On one hand, the audio system with a configurable area is mainly used in broadcasting local audio sound rather than collecting and transmitting local audio sound. Broadcasting local audio sound is different from collecting and transmitting local audio sound in terms of concepts as well as hardware implementation. On the other hand, since the audio system with a configurable area does not specify the basis on which the listening area is separated from the independent area, it is difficult to perform intelligent insulation. Therefore, the above technical problems of the prior art cannot be resolved from the audio collection end, and the problem of the ambient sound or the private audio being sent out unwittingly still exists.

SUMMARY OF THE INVENTION

To resolve the existing flaws of the prior art, the present invention provides a sound insulation method and a device and a system thereof based on LiFi optical communication method to realize intelligent sound insulation in audio calls and/or video calls.

According to one embodiment of the present invention, a sound insulation method based on LiFi optical communication is provided. The method includes: zoning a space into a public area and a private area by a light through the LiFi optical communication; collecting one or multiple sound sources; extracting an identified voice data from the sound sources; obtaining a sound source location of the sound sources according to the identified voice data; filtering a private voice data whose sound source location is located in the private area from the sound sources; and performing voice communication according to the filtered sound sources.

According to another embodiment of the present invention, a sound insulation device based on LiFi optical communication is provided. The device includes: a zoning module configured to zone a space into a public area and a private area by a light through the LiFi optical communication; a voice collection module configured to collect one or multiple sound sources; a voiceprint recognition module configured to extract an identified voice data of one or multiple sound sources from the sound sources according to a voiceprint feature; a positioning module configured to obtain a sound source location of the sound sources according to the identified voice data; a filtering module configured to filter a private voice data whose sound source location is located in the private area from the sound sources; and a voice communication module based on the LiFi optical communication configured to perform voice communication according to the filtered sound sources.

According to an alternate embodiment of the present invention, a sound insulation system based on LiFi optical communication is provided. The system includes: the said sound insulation device based on the LiFi optical communication, wherein the filtering module is further configured to filter a first private voice data whose sound source position is located in the public area; a LiFi optical communication module configured to transmit the light by a light source and receive a light source parameter represented by a flashing of the light for the zoning module to form the public area and the private area by the light source according to the light source parameter; a video collection module configured to collect an identified video data; and a visual processing module configured to search for two opposite sound sources whose positions face to each other in the public area according to the identified video data and define the two opposite sound sources face to each other as the first private voice data in the public area.

According to another alternate embodiment of the present invention, an electronic device is provided. The electronic device includes a processor and a storage medium storing a computer program, which performs the above steps when the computer program is executed by the processor.

According to another alternate embodiment of the present invention, a storage medium is provided. The storage medium stores a computer program, which performs the above steps when the computer program is executed by the processor.

The above and other aspects of the invention will become better understood with regard to the following detailed description of the preferred but non-limiting embodiment(s). The following description is made with reference to the related drawings.

DETAILED DESCRIPTION OF THE INVENTION

Details of the exemplary embodiments of the invention are fully disclosed below with reference to related drawings. However, the exemplary embodiments can have different implementations, and are not limited to the exemplifications below. Conversely, these embodiments make the present disclosure more complete and more comprehensive, and the concept of the exemplary embodiments can be fully delivered to anyone ordinarily skilled in the art. The features, structures or properties described in the present disclosure can be integrated in one or multiple embodiments.

Moreover, the related drawings are for schematically illustrating the present disclosure, and may not reflect actual sizes and scales. Designations common to the related drawings and embodiments are used to indicate identical or similar elements, and the descriptions of the identical or similar elements are not repeated. Some block diagrams of the related drawings represent functional entities and may not correspond to independent physical or logical entities. These functional entities can be realized in the form of software, or in one or multiple hardware modules or integrated circuits, or can be realized in different networks and/or processors and/or micro-controllers.

To resolve the existing flaws of the prior art, the present invention provides a sound insulation method, a device, a system, an electronic device and a storage medium to realize intelligent sound insulation in audio calls and/or video calls.

Figure 1:
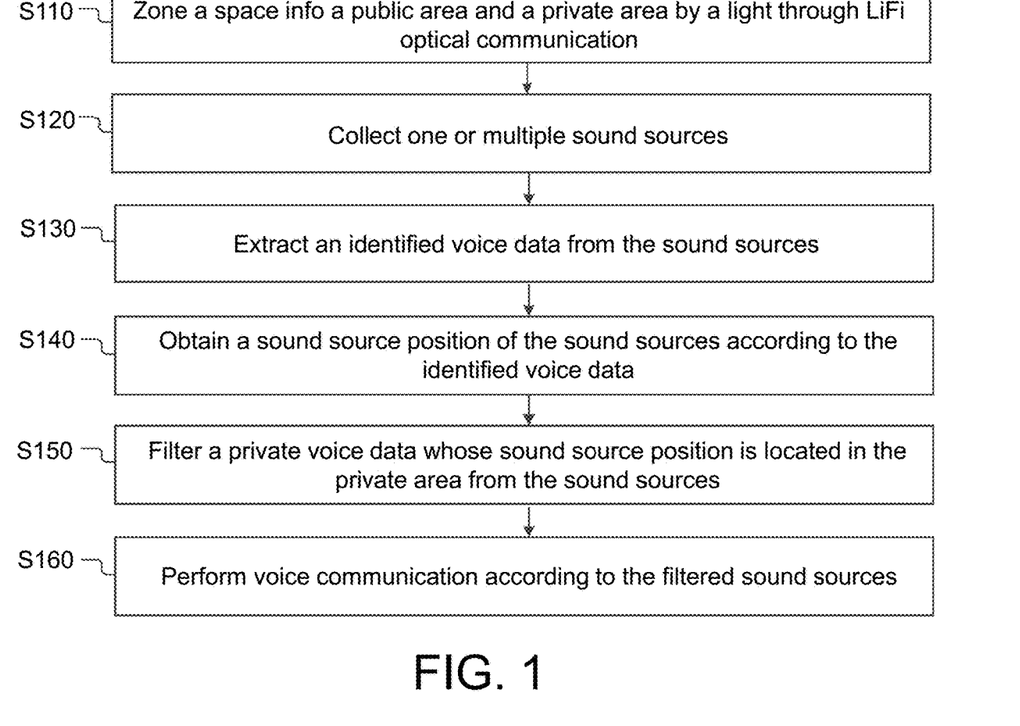
FIG. 1 shows a flowchart of a sound insulation method based on LiFi optical communication according to an embodiment of the present invention.

Referring to FIG. 1, a flowchart of a sound insulation method based on LiFi optical communication according to an embodiment of the present invention is shown.

FIG. 1 illustrates 6 steps.

In step S110, a space is zoned into a public area and a private area by a light through LiFi optical communication are determined. In step S120, one or multiple sound sources is collected. In step S130, an identified voice data is extracted from the sound sources according to a voiceprint feature. In step S140, a sound source location of the sound sources is obtained according to the identified voice data. In step S150, a private voice data whose sound source location is located in the private area is filtered from the sound sources. In step S160, voice communication is performed according to the filtered sound sources.

According to one aspect of the sound insulation method based on LiFi optical communication of the present invention, a public area and a private area are zoned by the light using the LiFi optical communication technology to send out the voice data in the public area and filter a private voice data in the private area, such that intelligent sound insulation can be performed, and the problems of total sound insulation and inconvenient operation of manual mute button can be resolved. According to another aspect, since the light sources are already disposed in respective areas, the public area and the private area can be separated by the disposed light sources using the LiFi optical communication technology without increasing hardware equipment, hardware cost can be reduced and operation convenience can be improved. According to an alternate aspect, in comparison to the method using voiceprint identity recognition, the algorithm for zoning a public area and a private area by the light using the LiFi optical communication technology is simpler, not only involving lower algorithm complexity, and further providing faster data processing speed and better system performance. According to another alternate aspect, the algorithm for zoning a public area and a private area by the light using the LiFi optical communication technology adopts an intuitive approach, and therefore resolves the problem of having difficulty in converting zone location into signals during manual area allocation.

Details of the sound insulation method based on LiFi optical communication of the present invention are disclosed below with related drawings FIG. 2 to FIG. 10.

Figure 2:
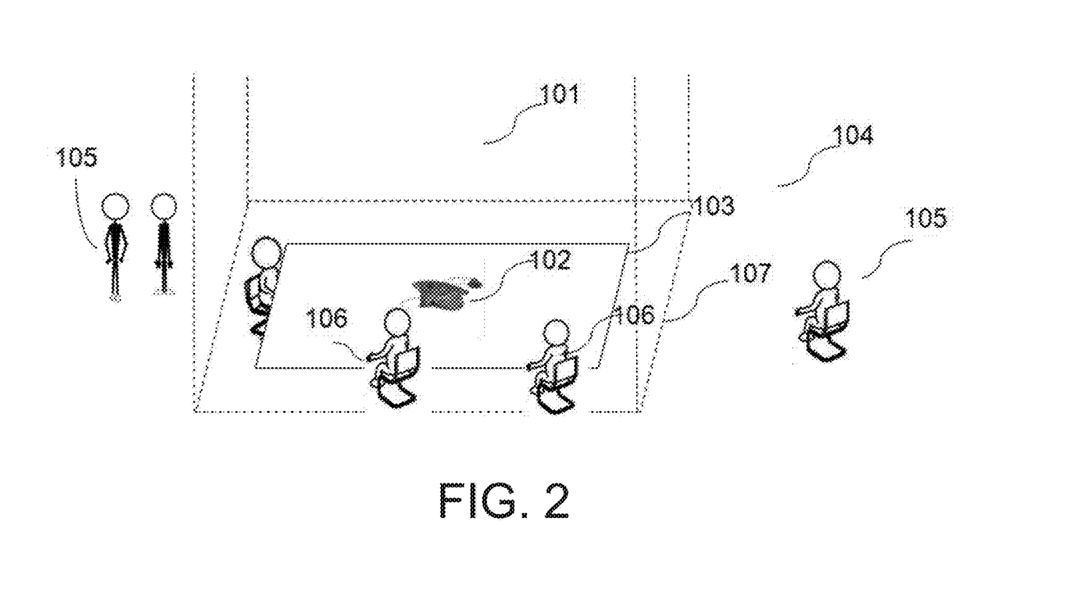
FIG. 2 is a schematic diagram of a collection space of a sound insulation method based on LiFi optical communication according to a specific embodiment of the present invention.

Referring to FIG. 2, a schematic diagram of a collection space of a sound insulation method based on LiFi optical communication according to a specific embodiment of the present invention is shown.

In the specific embodiment, the light zones the space into a public area 101 and a private area 104. The speech made in the public area 101 will be sent out for voice communication by a multi-party calling device 102 equipped with a voice collection module. The speech made in the private area 104 will be directly filtered off and will not be sent out by the multi-party calling device 102.

Specifically, a light source parameter is transmitted using the visible light communication technology to calculate and determine the public area 101 and the private area 104 zoned by the light source. The visible light communication technology (VLC) is also referred as "light fidelity technology (Li-Fi)". When ordinary LED bulbs are equipped with micro-chips, the bulbs can flash at a frequency of millions of times per second to transmit the signal. Space zone using the LiFi optical communication technology has the following advantages: 1) green and safe without radiation; 2) high precision in indoor positioning; 3) fast communication speed (the communication speed is 100 times faster than Wi-Fi communication); 4) abundant resources (can be concurrently realized with illumination at anywhere). The light source parameter can be a radiation angle or a movement path of the light source, and the present invention is not limited thereto. The radiation scope of the light source can be defined for area zone according to the radiation angle or the movement path of the light source.

Figure 4:
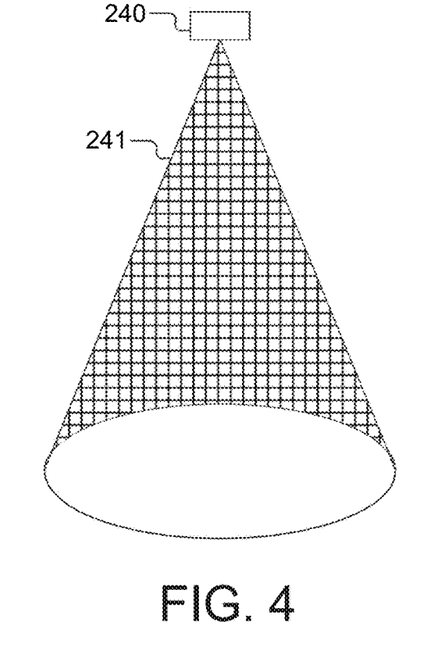
FIG. 4 to FIG. 6 are schematic diagrams of a light source zone area according to an embodiment of the present invention.

In some specific embodiments, the coverage space of the light source can be defined according to the light source parameter, and the public area and the private area can also be zoned by the light source according to the light source parameter. As indicated in FIG. 4, the radiation of the light source 240 covers a partial space 241. The partial space 241 covered by the radiation of the light source 240 is defined as a public area, and the partial space 241 not covered by the radiation of the light source 240 is defined as a private area. Or, the partial space covered by the radiation of the light source 240 is defined as a private area, and the partial space not covered by the radiation of the light source 240 is defined as a public area.

Figure 5:
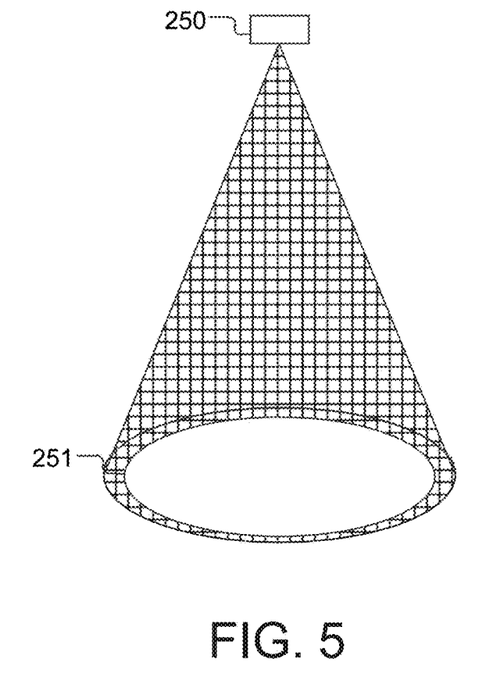
Figure 6:
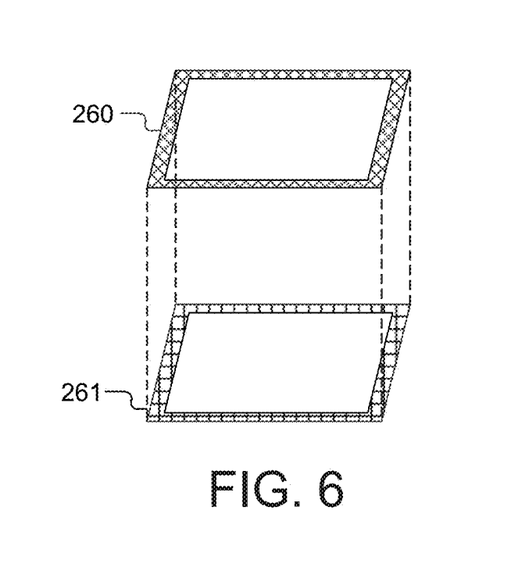

In some other specific embodiments, a space surrounded by the light source can be defined according to the light source parameter, and the public area and the private area can be zoned by the light source according to the light source parameter. As indicated in FIG. 5 and FIG. 6, the light source 250 forms a band of light, and the space 251 surrounded by the band of light can be zoned. For example, the space 251 surrounded by the band of light formed through the radiation of the light source 250 is defined as a public area, and the space 251 not surrounded by the band of light formed through the radiation of the light source 250 is defined as a private area. Or, the space 251 surrounded by the band of light formed through the radiation of the light source 250 is defined as a private area, and the space 251 not surrounded by the band of light formed through the radiation of the light source 250 is defined as a public area. Similarly, the light source 260 forms a band of light, the space 261 surrounded by the band of light can be used for space zone.

In above embodiments, the constant radiation area of the light source can form the coverage space of the light source or the space surrounded by the light irradiated on a constant area, and the light source parameter may include light source location, light source radiation covering angle, light source radiation angle and so on. In above embodiments, the constant radiation area of the light source can form the coverage space of the light source or the space surrounded by the light irradiated on a constant area, and the light source parameter may include light source movement path, light source radiation covering angle, and light source radiation angle during the movement of the light source. The coverage space of the light source or the space surrounded by the light source can be calculated for space zone according to the light source parameter.

Figure 3:
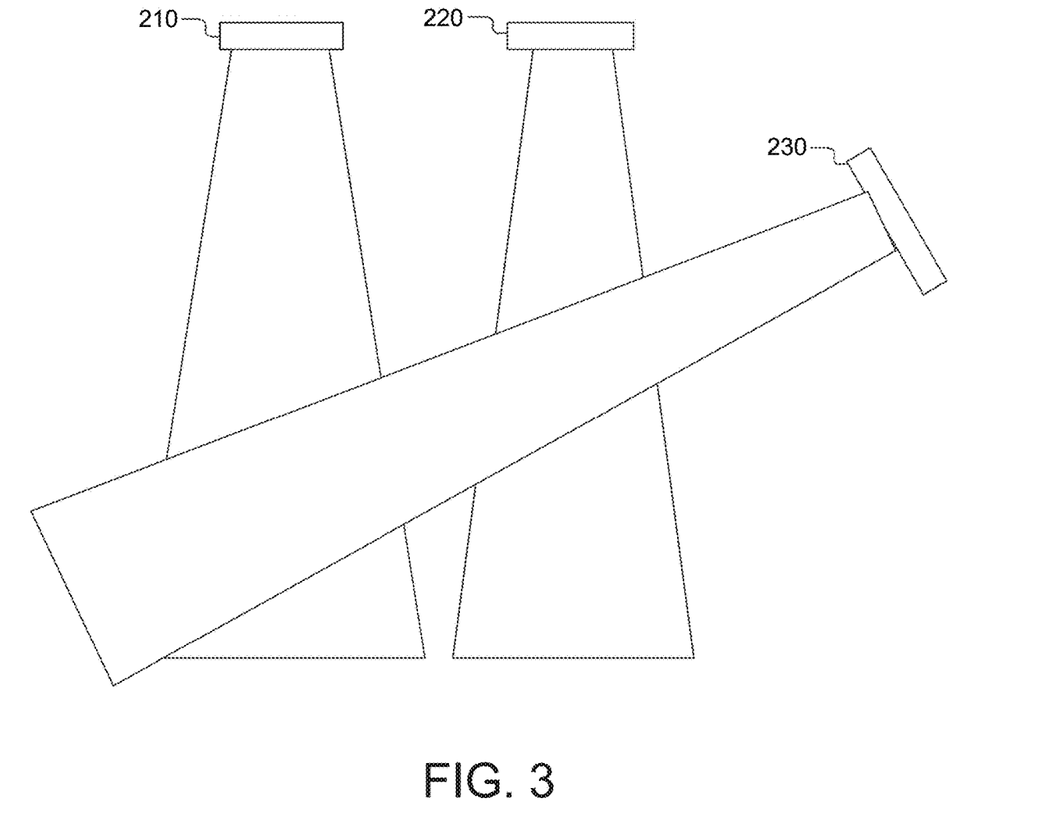
FIG. 3 is a schematic diagram of overlapped light source zone areas according to an embodiment of the present invention.

In each of the above embodiments, referring to FIG. 3, multiple light sources 210, 220, and 230 can be disposed in a space, and a public area and a private area can be correspondingly zoned by each of the light sources. For example, the space covered by the light sources 210 and 220 is defined as a public area, and both the space not covered by the light sources 210 and 220 and the space covered by the light source 230 are defined as a private area, wherein the priority of the light source 230 is higher than that of the light sources 210 and 220, and when the space covered by the light source 230 overlaps the space covered by the light sources 210 and 220, the overlapping area is defined as a private area according to the light source 230.

In each of the above embodiments, the constant radiation area of the light source can be realized in different shapes and different sizes by the light source. For example, the light source can irradiate the speaker's seat, such that only the speaker's voice data can be sent out for voice communication by the multi-party calling device 102. For example, the light source can irradiate according to the shape of the conference table 103, such that only the voice data of the speakers around the conference table can be sent out for voice communication by the multi-party calling device 102. In the present invention, area zone can be realized in different shapes and sizes by the light sources, which can be moved to adjust the shapes and sizes of the portioned areas.

Refer to FIG. 2. After the light source zones the space into a public area 101 and a private area 104, the voice collection module of the multi-party calling device 102 separates each speaker's voice data from the sound sources in the collection space according to each speakers voiceprint to obtain multiple speakers' voice data. Meanwhile, during the process of extracting the identified speakers' voice data, the non-human ambient voice data can be filtered from the sound sources.

After multiple speakers' voice data are obtained, the sound source (the speaker) location can be obtained according to a private voice data to obtain a sound source location. Specifically, the sound source can be located by the microphone array disposed in the multi-party calling device 102. The distance between a sound source and a microphone can be obtained according to the time at which a voice data is received by the microphone, and the sound source location can be obtained according to the location relation between the microphones of the microphone array.

Whether a speaker is in the public area 101 or the private area 104 can be determined according to the sound source location. For example, as indicated in FIG. 2, the sound source locations of the speaker 106 and the speaker 105 show that the speaker 106 and the speaker 105 are respectively in the public area 101 and the private area 104. Then, a private voice data of the speaker 105 in the private area 104 can be filtered from the sound sources, and only the speech in the public area 101 can be sent out for voice communication by the multi-party calling device 102 equipped with a voice collection module.

Figure 7:
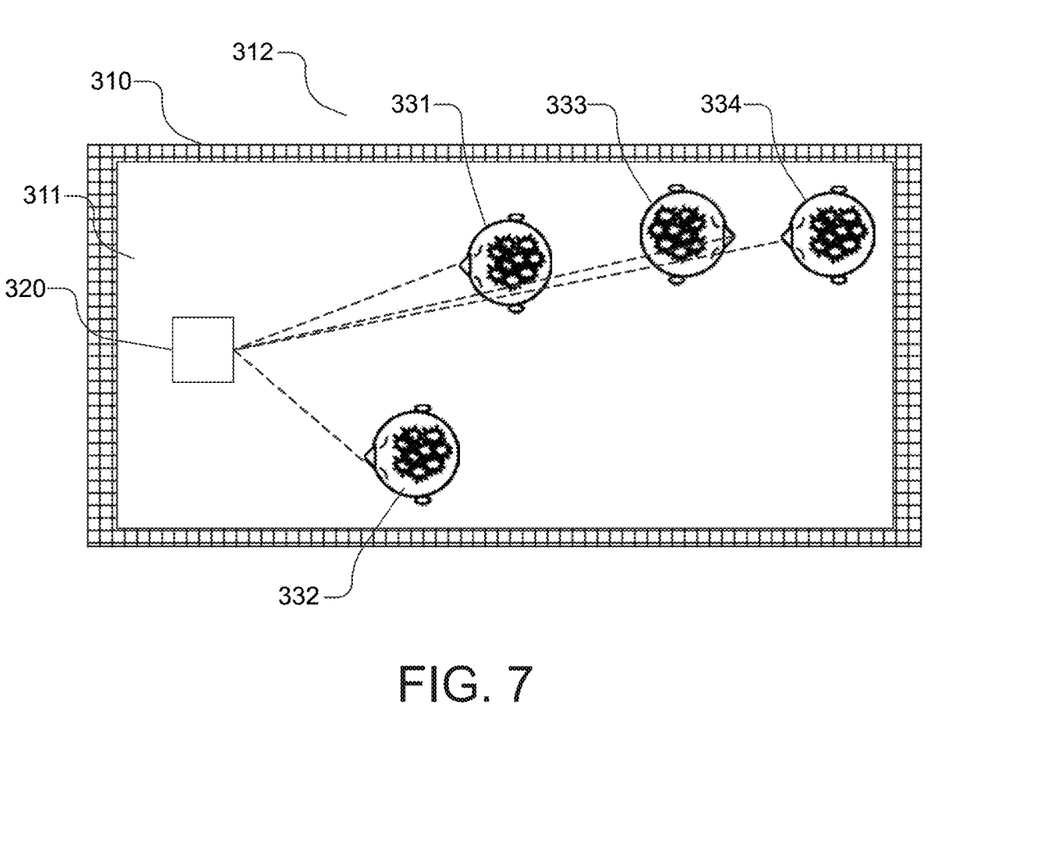
FIG. 7 is a top view of a public area of a sound insulation method based on LiFi optical communication according to a specific embodiment of the present invention.

Considering the scenario that the conversation between the speakers in the public area does not need to be transmitted, a solution for the said scenario is provided for the above embodiments of the present invention. Referring to FIG. 7, a top view of a public area of a sound insulation method based on LiFi optical communication according to a specific embodiment of the present invention is shown.

As indicated in FIG. 7, the band of light 310 of the light source zones the space into a public area 311 and a private area 312. In the public area 311, each speaker can participate in a video conference through a video calling device 320. In the public area 311, the speakers 332 and 331 face the video calling device 320 to participate in a video conference. Although the speakers 333 and 334 both are in the public area 311, the speakers 333 and 334 are facing and talking with each other, and their voices do not need to be sent to a remote end by the video calling device 320. To resolve the above technical problem, the present embodiment can recognize each speaker from the first video data in the collection space of the video calling device 320 using the facial recognition technology, and can further obtain the location of each speaker relative to the video calling device 320 according to the location of each speaker in the image of the first identified video data. According to the above embodiments, the location of each sound source relative to the video calling device 320 can be located according to the identified voice data. Therefore, according to the matching of location information, the speaker and the identified voice data at the same location can be linked. The facing direction of each speaker in the image of the first video data can be recognized using the facial recognition technology, and the sound sources of the speakers facing each other are defined as a private voice data. The private voice data whose sound source location is located in the public area is filtered from the sound sources of the speakers. In the embodiment of FIG. 7, through the above steps, the voice data of the speakers 333 and 334 can be defined as a private voice data, and is filtered from the sound sources in the public area to avoid the private voice data in the public area 311 being transmitted.

Figure 8:
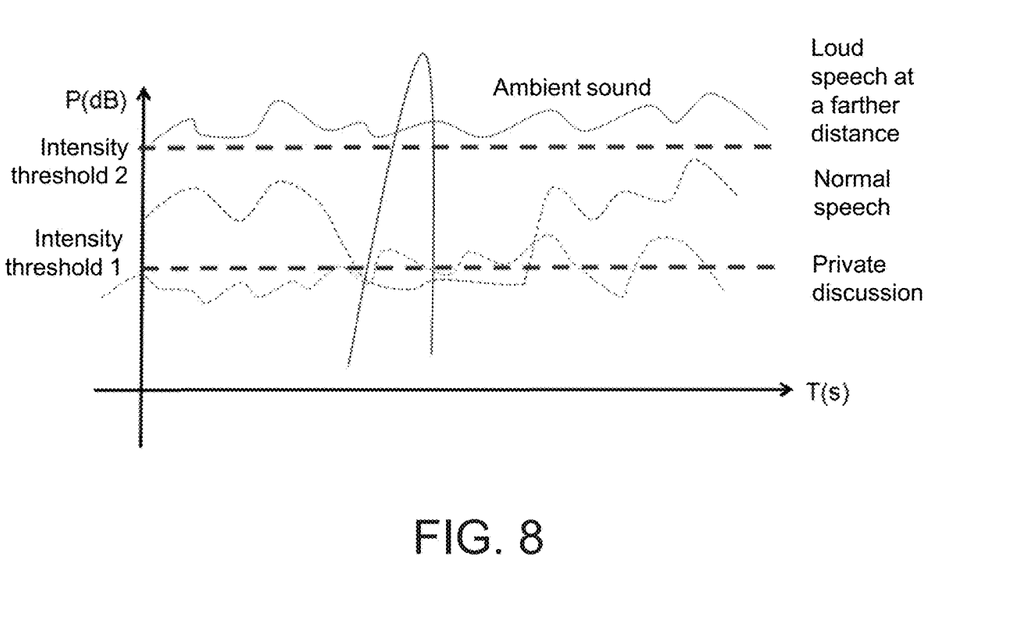
FIG. 8 is a wave pattern of various sound sources in a public area of a sound insulation method based on LiFi optical communication according to a specific embodiment of the present invention.

In some embodiments, the voice in the public area can further be filtered according to the audio intensity and location of the sound source. Referring to FIG. 8, a wave pattern of various sound sources in a public area of a sound insulation method based on LiFi optical communication according to a specific embodiment of the present invention is shown.

As indicated in FIG. 8, the curve with a larger amplitude of variation in audio intensity and a shorter duration represent ambient sound. As for the remaining curves, the solid curve represents the voice data of a sound source separated from the collection module which collects the voice data of a sound source by a distance greater than or equivalent to a distance threshold; the dotted curve represents the voice data of a sound source separated from the collection module which collects the voice data of a sound source by a distance less than the distance threshold.

When the audio intensity of the sound source is greater than the first intensity threshold and the sound source is separated from the collection module which collects the voice data of a sound source by a distance less than the distance threshold, the sound source can be regarded as a normal speech in the public area. When the audio intensity of the sound source is greater than the second intensity threshold and the sound source is separated from the collection module which collects the voice data of a sound source by a distance greater than or equivalent to a distance threshold, the sound source can be regarded as a loud speech in the public area. When the audio intensity of the sound source is less than or equivalent to a first intensity threshold, the sound source can be regarded as a private discussion in the public area. The sound source having an audio intensity less than or equivalent to a first intensity threshold and separated from the sound source collection module by a distance greater than or equivalent to a distance threshold is filtered, and/or the sound source having an audio intensity less than or equivalent to a second intensity threshold and separated from the sound source collection module which collects the voice data of a sound source by a distance less than or equivalent to a distance threshold is filtered, and only the normal speech and/or the loud speech at a farther distance are transmitted. The first intensity threshold can be 40 dB; the second intensity threshold can be 60 dB; the distance threshold can be 0.5-2 meters. In each embodiment, the first intensity threshold and the second intensity threshold can be adjusted in a range of 40-60 dB.

A number of embodiments of the present invention are schematically described above. These embodiments can be implemented independently or together, and the present invention is not limited thereto.

Figure 9:
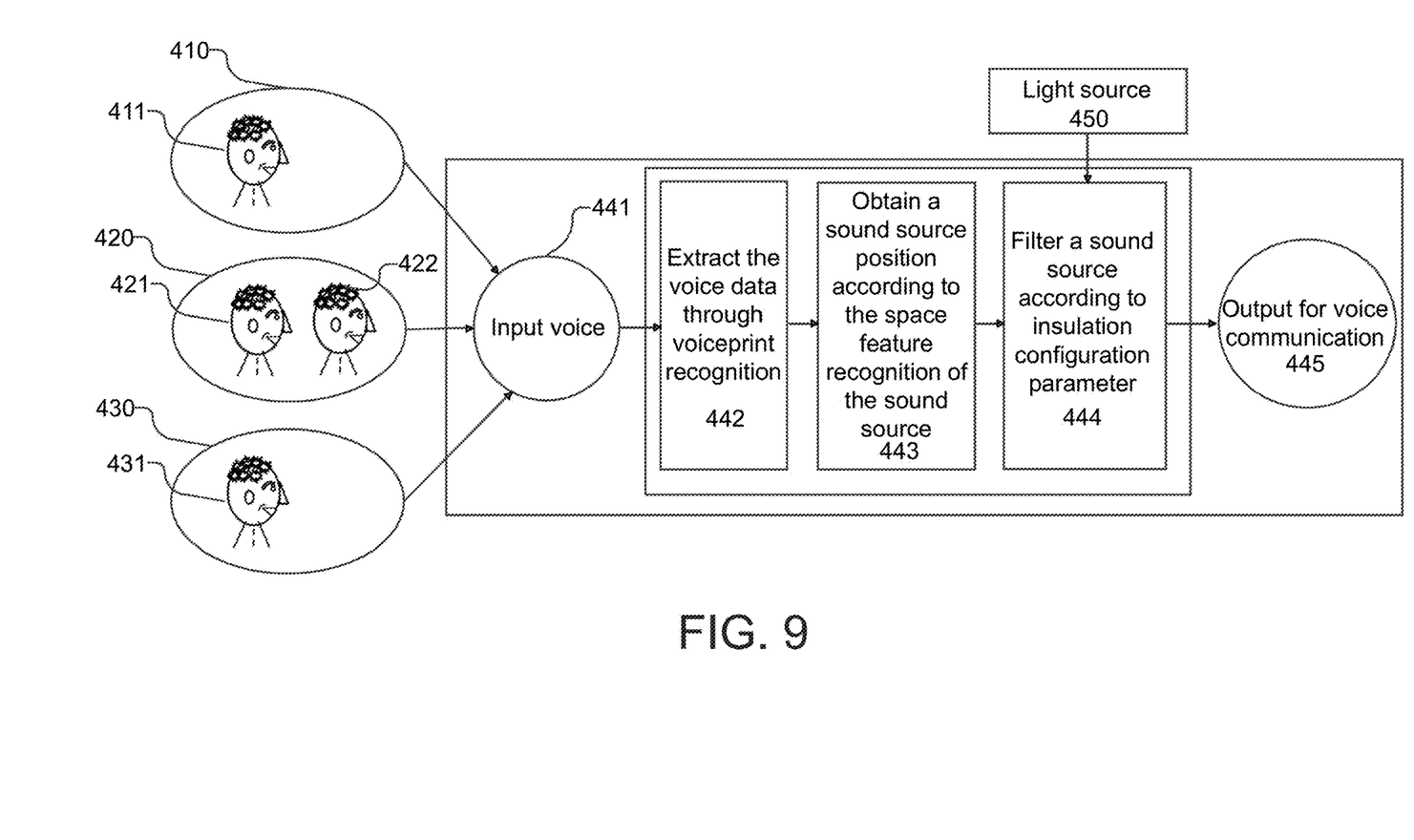
FIG. 9 is a schematic diagram of a sound insulation method based on LiFi optical communication according to a specific embodiment of the present invention.

Referring to FIG. 9, a schematic diagram of a sound insulation method based on LiFi optical communication according to a specific embodiment of the present invention is shown. In the present embodiment of the present invention, the space is zoned into different areas by the light sources, and the voice data in different areas can be filtered according to different parameters. For example, speaker 411 is in area 410; speakers 421 and 422 are in area 420; speaker 431 is in area 430.

The speeches of the speakers in zoned areas are input (441), and the sound sources are recognized and extracted through voiceprint recognition (442). Then, the sound source location is obtained according to the space feature recognition of the sound source (443). The area in which each sound source is located is determined according to the areas zoned by the light source 450, and the sound source is filtered according to the insulation configuration parameter of respective areas (444). For example, a voice data of the speaker 411 in the area 410 does not need to be filtered; whether voice data of the speakers 421 and 422 in the area 420 need to be filtered is determined according to the audio intensity and the location information; a private voice data of the speaker 431 in the area 430 will be filtered. The filtered voice data is outputted for voice communication (445) to realize the present embodiment.

Figure 10:
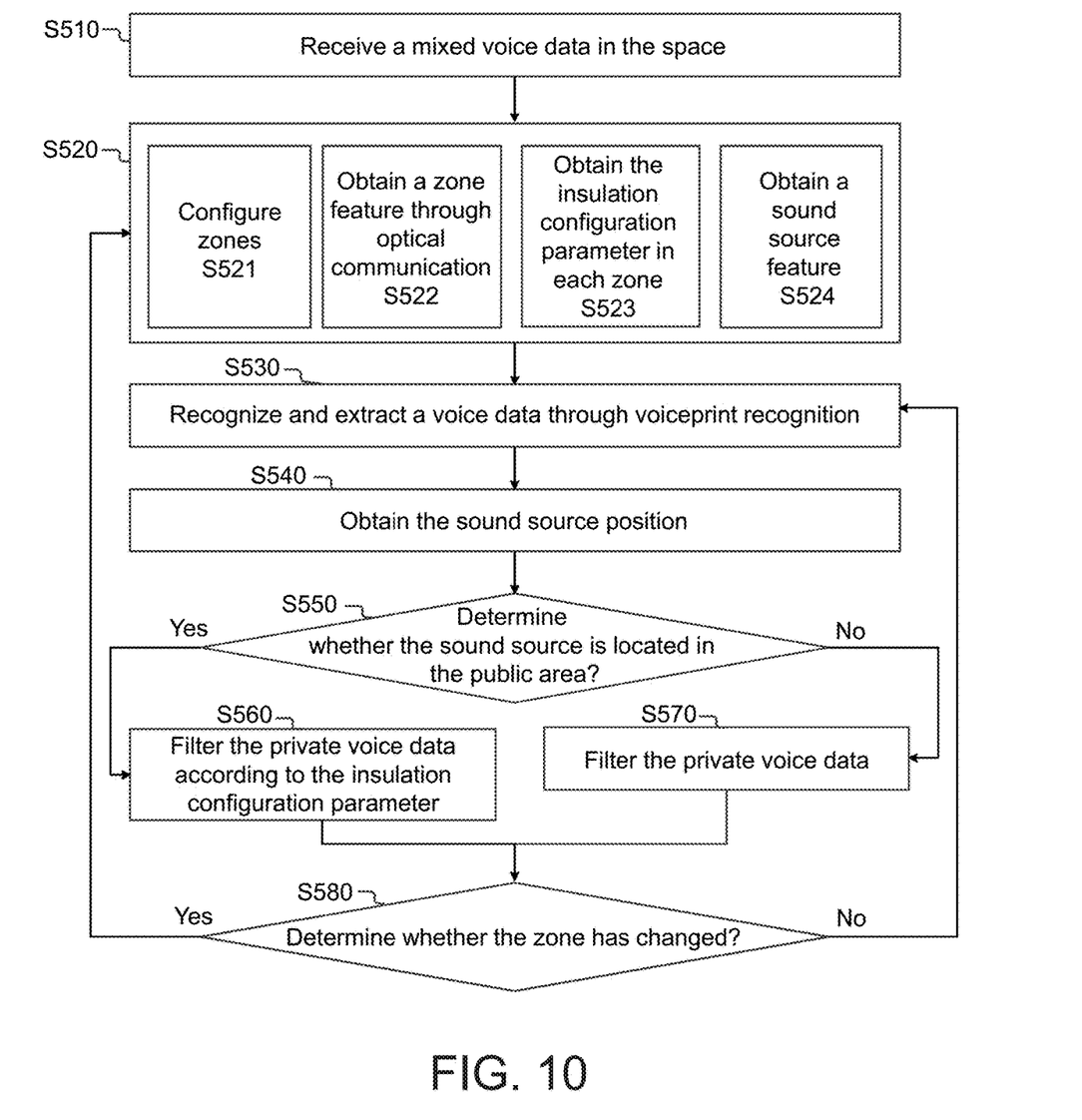
FIG. 10 is a flowchart of a sound insulation method based on LiFi optical communication according to a specific embodiment of the present invention.

Referring to FIG. 10, a flowchart of a sound insulation method based on LiFi optical communication according to a specific embodiment of the present invention is shown.

In step S510, a mixed voice data in the space is received.

Step S520 includes 4 sub-steps 521-524.

In step S521, zones are configured. In the present step, the irradiation of the light source (such as covering a particular seat or a particular area) can be configured according to actual needs (for example, covers a particular seat). The step can further receive a voice signal representing an equipment feature, such as the space location of the equipment.

In step S522, a zone feature is obtained through LiFi optical communication. The present step is equivalent to obtaining the location parameters of a number of zones zoned by the light sources through LiFi optical communication.

In step S523, the insulation configuration parameter in each zone is obtained. In the present step, the filtering method of each zone is determined (for example, according to the audio intensity and location of the voice data).

In step S524, a sound source feature is obtained. The present step is equivalent to obtaining the voiceprint feature of human voice.

In step S530, a voice data is recognized and extracted through voiceprint recognition, such that multiple speakers' voice data can be obtained.

In step S540, the sound source location of each sound source is obtained.

In step S550, whether the sound source is located in the public area is determined.

If the determination in step S550 is yes, then the method proceeds to step S560, a private voice data is filtered according to the insulation configuration parameter of step S523.

If the determination in step S550 is no, that is, the sound source in the private area, then the method proceeds to step S570, the private voice data is directly filtered.

In step S580, whether the zone has changed is determined. If the determination in step S580 is yes, then the method returns to step S520; otherwise the method proceeds to step S530.

The above exemplification is merely a specific implementation of the present invention, and the present invention is not limited thereto.

Figure 11:
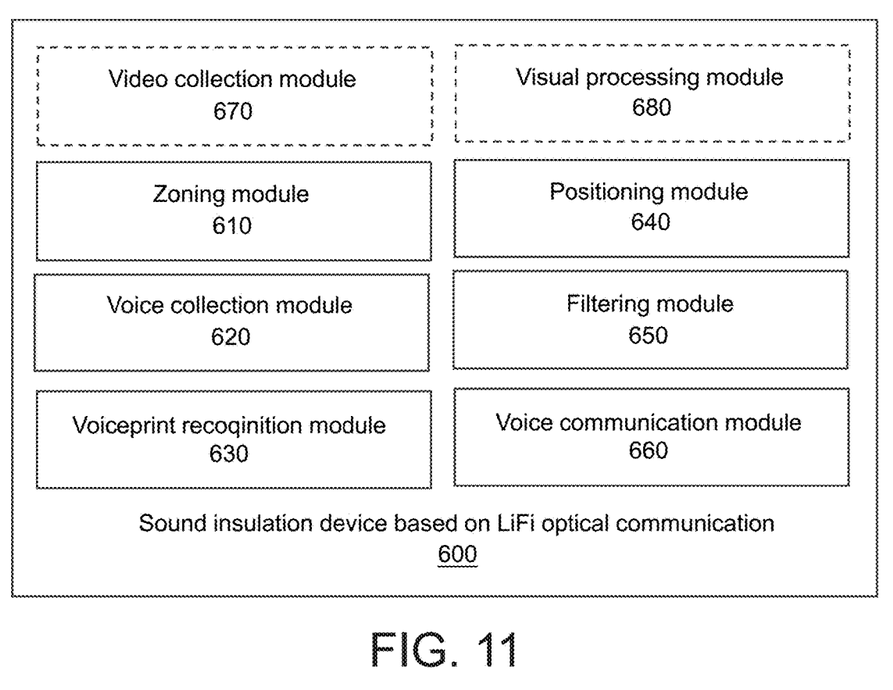
FIG. 11 is a module diagram of a sound insulation device based on LiFi optical communication according to an embodiment of the present invention.

The present invention further provides a sound insulation device based on LiFi optical communication. Referring to FIG. 11, a module diagram of a sound insulation device based on LiFi optical communication according to an embodiment of the present invention is shown. The sound insulation device based on LiFi optical communication 600 includes a zoning module 610, a voice collection module 620, a voiceprint recognition module 630, a positioning module 640, a filtering module 650 and a voice communication module 660 based on the LiFi optical communication.

The zoning module 610 is configured to zone a space into a public area and a private area by a light through LiFi optical communication.

The voice collection module 620 is configured to collect one or multiple sound sources.

The voiceprint recognition module 630 is configured to extract an identified voice data from the sound sources according to a voiceprint feature.

The positioning module 640 is configured to obtain a sound source location of the sound sources according to the identified voice data.

The filtering module 650 is configured to filter a private voice data whose sound source location is located in the private area from the sound sources.

The voice communication module 660 based on LiFi optical communication is configured to perform voice communication according to the filtered sound sources.

According to one aspect of the sound insulation device based on LiFi optical communication of the present invention, a public area and a private area are zoned by the light using the LiFi optical communication technology to send out a voice data in the public area and filter a private voice data in the private area, such that intelligent sound insulation can be performed, and the problems of total sound insulation and inconvenient operation of manual mute button can be resolved; on the other hand since the light sources are already disposed in respective areas, the public area and the private area can be zoned by the disposed light sources using the LiFi optical communication technology without increasing hardware equipment, hardware cost can be reduced and operation convenience can be improved. According to an alternate aspect, in comparison to the method using voiceprint identity recognition, the algorithm for zoning a public area and a private area by the light using the LiFi optical communication technology is simpler, not only involving lower algorithm complexity, and further providing faster data processing speed and better system performance. According to another alternate aspect, the algorithm for zoning a public area and a private area by the light using the LiFi optical communication technology adopts an intuitive approach, and therefore resolves the problem of having difficulty in converting zone location into signals during manual area allocation.

FIG. 11 schematically illustrates the modules of the sound insulation device based on LiFi optical communication of the present invention. Given that the concept of the present invention is not breached, the disintegration, combination or addition of the modules are within the scope of claim of the present invention. Each module can be realized by hardware, software, firmware, or a combination thereof.

In a specific embodiment of the present invention, the sound insulation device based on LiFi optical communication further includes an optical communication module 710. The optical communication module 710 is configured to transmit a light by a light source 700 and receive a light source parameter represented by the flashing of the light source 700 for the zoning module to form the public area and the private area by the light source according to the light source parameter.

In a specific embodiment of the present invention, the zoning module 610 includes a coverage zone or a mobile zone, and the public area and the private area are zoned by the light source 700 according to the light source parameter. The coverage zone is a coverage space of the light source defined according to the light source parameter, and the mobile zone is a space surrounded by the light source 700 defined according to the light source parameter.

In a specific embodiment of the present invention, the sound insulation device based on LiFi optical communication includes a voiceprint recognition module 630. The voiceprint recognition module 630 is configured to extract an identified voice data of one or multiple personal sound sources and the ambient voice data from the sound sources according to the voiceprint feature. The filtering module 650 further filters the ambient voice data from the sound sources.

In a specific embodiment of the present invention, the sound insulation device based on LiFi optical communication further includes a video collection module 670 and a visual processing module 680. The video collection module 670 is configured to collect an identified video data. The visual processing module 680 is configured to match the speech object and a voice data in the public area according to the identified video data, and define the corresponding voice data of the speech objects opposite to each other as a private voice data according to the identified video data. The filtering module further filters the private voice data whose sound source location is located in the public area from the sound sources.

A number of embodiments of the present invention are schematically described above. These embodiments can be implemented independently or together, and the present invention is not limited thereto.

Figure 12:
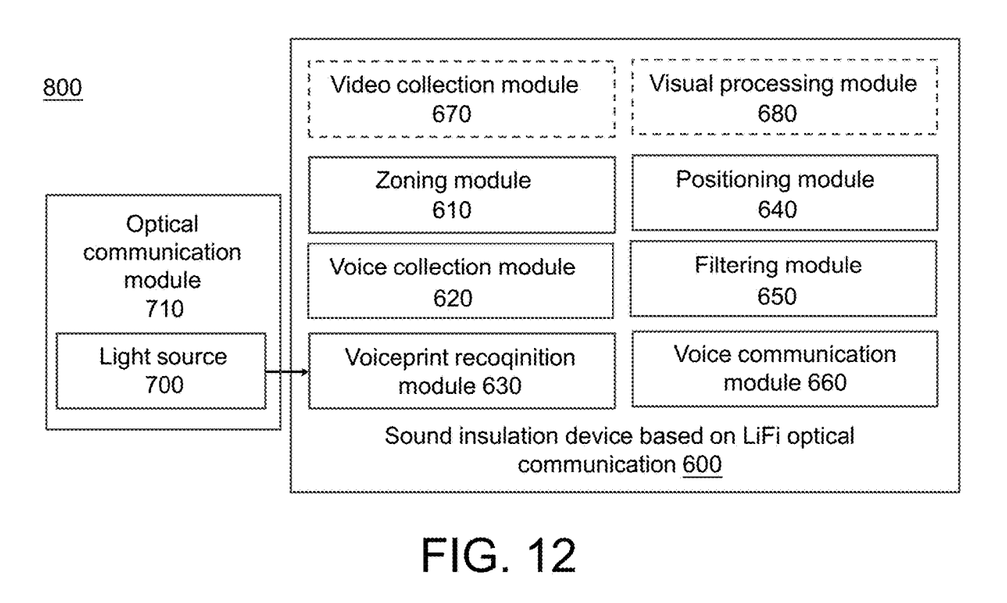
FIG. 12 is a module diagram of a sound insulation system based on LiFi optical communication according to an embodiment of the present invention.

The present invention provides a sound insulation system based on LiFi optical communication. Referring to FIG. 12, a module diagram of a sound insulation system 800 based on LiFi optical communication according to an embodiment of the present invention is shown.

The sound insulation system 800 based on LiFi optical communication includes the sound insulation device based on LiFi optical communication 600 of FIG. 11 and an optical communication module 710. The optical communication module 710 is configured to transmit the light by a light source 700 and receive a light source parameter represented by a flashing of the light for the zoning module 610 to form the public area and the private area by the light source according to the light source parameter. The light source 700 can be the constant radiation light source or the mobile radiation light source.

According to one aspect of the sound insulation system based on LiFi optical communication of the present invention, a public area and a private area are zoned by the light using the LiFi optical communication technology to send out a voice data in the public area and filter a private voice data in the private area, such that intelligent sound insulation can be performed, and the problems of total sound insulation and inconvenient operation of manual mute button can be resolved; on the other hand since the light sources are already disposed in respective areas, the public area and the private area can be zoned by the disposed light sources using the LiFi optical communication technology without increasing hardware equipment, hardware cost can be reduced and operation convenience can be improved. According to an alternate aspect, in comparison to the method using voiceprint identity recognition, the algorithm for zoning a public area and a private area by the light using the LiFi optical communication technology is simpler, not only involving lower algorithm complexity, and further providing faster data processing speed and better system performance. According to another alternate aspect, the algorithm for zoning a public area and a private area by the light using the LiFi optical communication technology adopts an intuitive approach, and therefore resolves the problem of having difficulty in converting regional location into signals during manual area allocation.

In an exemplary embodiment of the present disclosure, a computer readable storage medium storing a computer program is provided. The program, when executed by a processor, can perform the steps of the sound insulation method based on LiFi optical communication of any of the above embodiments. In some possible embodiments, each aspect of the present invention can further be realized as a program product, which includes a programming code. When the program product is executed by a terminal equipment, the programming code enables the terminal equipment to perform the steps of the sound insulation method based on LiFi optical communication described in each exemplary embodiment of the present invention.

Figure 13:
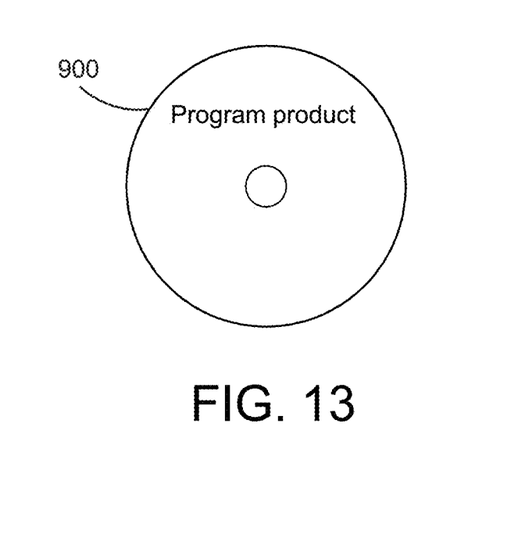
FIG. 13 is a schematic diagram of a computer readable storage medium according to an exemplary embodiment of the present disclosure.

Referring to FIG. 13, a program product 900 configured to implement the above method according to an embodiment of the present invention is shown. The program product 900, which includes a programming code stored in memory storage, can be executed by a computer readable device, such as personal computer. However, the program product of the present invention is not limited thereto. The readable storage medium can be realized by any tangible medium having or storing a program. The program can be used by or combined with an instruction executing system, device or element.

The program product can adopt any combination of one or multiple readable media. The readable medium can be realized by a readable signal medium or a readable storage medium. The readable storage medium includes but is not limited to electric, magnetic, optical, electromagnetic, infrared or semiconductor system, device or element, or any combination thereof. More specific examples (non-exhaustive list) of the readable storage medium include electric connection with one or multiple wires, portable optical drive, hard disc, random access memory (RAM), read only memory (ROM), erasable and programmable read only memory (EPROM or flash memory), optical fiber, portable compact disc read only memory (CD-ROM), optical memory, magnetic memory, or any suitable combination thereof.

The computer readable storage medium may include an information signal which is broadcasted in the baseband or used as a part of the carrier, wherein the computer readable storage medium carries a readable programming code. The information signal can be realized in many different forms, and includes but is not limited to electromagnetic signal, optical signal or any suitable combination thereof. The readable storage medium can further be realized as any readable medium other than a readable storage medium. The readable medium can send, broadcast, or transmit a program that can be used by or combined with an instruction executing system, device or element. The programming code stored in the readable storage medium can be transmitted by any suitable medium, which includes but is not limited to wireless transmission, wired transmission, optical fiber, RF, or any suitable combination thereof.

The programming code for executing the present invention can be programmed using one programming language or a combination of multiple programming languages. The programming languages include object-oriented programming languages, such as Java or C++, and may further include conventional procedural programming languages, such as "C" language or similar programming languages. The programming code can completely be executed by a tenant computing equipment, partly be executed by a tenant equipment, executed as an independent package software, partly executed by a tenant computing equipment and partly be executed by a remote computing equipment, or completely executed by a remote computing equipment or server. When a remote computing equipment is used, the remote computing equipment can be connected to the tenant computing equipment through any types of networks such as local area network (LAN) or wide area network (WAN), or can be connected to an external computing equipment (such as through the connection provided by an Internet service provider).

In an exemplary embodiment of the present disclosure, an electronic device is provided. The electronic device may include a processor and a memory storing executable instructions of the processor. The processor executes the executable instructions to perform the steps of the sound insulation method based on LiFi optical communication disclosed in any of the above embodiments.

Anyone ordinary skilled in the art should understand that each aspect of the present invention can be realized as a system, a method or a program product. Therefore, each aspect of the present invention can be realized as complete hardware, complete software (including firmware, microcode and so on), or a combination of hardware and software, and is referred as "circuit", "module" or "system".

Figure 14:
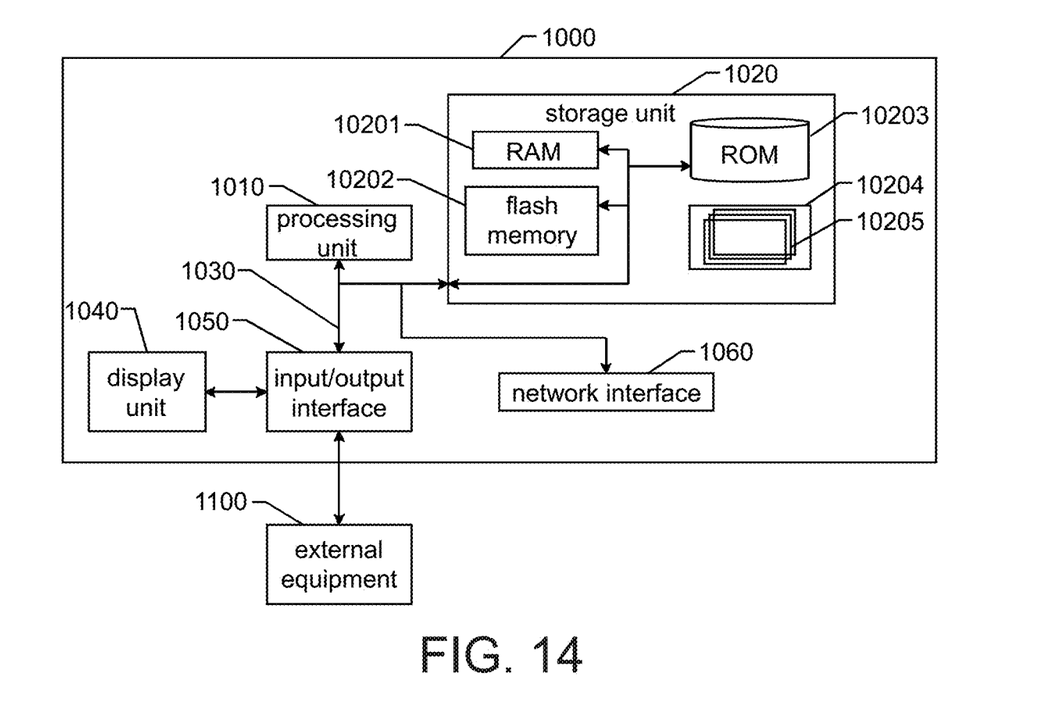
FIG. 14 is a schematic diagram of an electronic device according to an exemplary embodiment of the present disclosure.

Referring to FIG. 14, a schematic diagram of an electronic device 1000 according to an exemplary embodiment of the present disclosure is shown. The electronic device 1000 of FIG. 14 is exemplified for exemplary purpose only, not for limiting the functions and scope of application disclosed in any embodiments of the present invention.

As indicated in FIG. 14, the electronic device 1000 can be realized by a general computing equipment. The elements of the electronic device 1000 include but are not limited to at least one processing unit 1010, at least one storage unit 1020, a bus 1030 connecting different system elements (including the storage unit 1020 and the processing unit 1010), and a display unit 1040.

The storage unit stores a programming code, which can be executed by the processing unit 1010 to perform the steps of the sound insulation method based on LiFi optical communication described in each embodiment of the present invention as disclosed in the present specification. For example, the processing unit 1010 can perform the steps of FIG. 1 or FIG. 10.

The storage unit 1020 may include a volatile storage readable medium, such as random access memory (RAM) 10201 and/or flash memory storage unit 10202, may further include a read only memory (ROM) 10203.

The storage unit 1020 may further include a program/utility 10204 with at least one program module 10205. The program module 10205 include but is not limited to operating system, one or multiple application programs, and other program modules and program information. Each exemplification or a combination of the exemplifications may include network environment.

The bus 1030 can be represented as one or multiple bus structures, including storage unit bus, storage unit controller, peripheral bus, graphics acceleration port, processing unit or a local bus using any bus structure of multiple bus structures.

The electronic device 1000 can communicate with one or multiple external equipment 1100 (such as keyboard, pointing device, Bluetooth device), and can further communicate with one or multiple equipment enabling the tenant to communicate with the electronic device 1000, and/or communicate with any equipment (such as router or modem) enabling the electronic device 1000 to communicate with one or multiple other computing equipment. Such communication can be performed by an input/output (1/O) interface 1050. Moreover, the electronic device 1000 can further communicate with one or multiple networks (such as local area network (LAN), wide area network (WAN), and/or public interface such as Internet) through a network interface card 1060. The network interface card 1060 can communicate with other modules of the electronic device 1000 through the bus 1030. Although it is not illustrated in the diagrams, it should be understood that the electronic device 1000 can be combined with other hardware and/or software module, which includes but is not limited to micro-code, device driving program, redundant processing unit, external disc drive array, RAID system, magnetic tape driver and information backup storage system.

Based on the descriptions of the above embodiments, anyone ordinary skilled in the art should understand that the exemplary embodiments can be realized in the form of software, or software combined with necessary hardware. Therefore, technical solutions of the embodiments of the present disclosure can be realized in the form of a software product, which can be stored in a volatile storage medium (such as flash drive or removable hard disc) or a network. The software product includes some instructions enabling a computing equipment (such as a personal computer, a server, or a network equipment) to execute the sound insulation method based on LiFi optical communication disclosed in above embodiments of the present disclosure.

In comparison to the prior art, the method and the device provided by the present invention have the following advantages:

1) A public area and a private area are zoned by the light using the LiFi optical communication technology to send out a voice data in the public area and filter a private voice data in the private area, such that intelligent sound insulation can be performed, and the problems of total sound insulation and inconvenient operation of manual mute button can be resolved;

2) Since the light sources are already disposed in respective areas, the public area and the private area can be zoned by the disposed light sources using the LiFi optical communication technology without increasing hardware equipment, hardware cost can be reduced and operation convenience can be improved;

3) In comparison to the method using voiceprint identity recognition, the algorithm for zoning a public area and a private area by the light using the LiFi optical communication technology is simpler, not only involving lower algorithm complexity, and further providing faster data processing speed and better system performance:

4) The algorithm for zoning a public area and a private area by the light using the LiFi optical communication technology adopts an intuitive approach, and therefore resolves the problem of having difficulty in converting regional location into signals during manual area allocation.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A sound insulation method based on LiFi optical communication, comprising:
    zoning a space into a public area and a private area by a light through the LiFi optical communication;
    collecting one or multiple sound sources;
    extracting an identified voice data from the sound sources according to a voiceprint feature;
    obtaining a sound source location of the sound sources according to the identified voice data;
    filtering a private voice data whose sound source location is located in the private area from the sound sources; and
    performing voice communication according to the filtered sound sources.

2. The sound insulation method based on LiFi optical communication according to claim 1, wherein zoning the public area and the private area by the light through LiFi optical communication comprises:
    transmitting the light by a light source and receiving a light source parameter represented by a flashing of the light;
    zoning the public area and the private area by the light source according to the light source parameter.

3. The sound insulation method based on LiFi optical communication according to claim 2, wherein zoning the public area and the private area by the light source according to the light source parameter comprises:
    defining a coverage space of the light source according to the light source parameter, and zoning the public area and the private area by the light source according to the light source parameter; or
    defining a space surrounded by the light source according to the light source parameter, and zoning the public area and the private area by the light source according to the light source parameter.

4. The sound insulation method based on LiFi optical communication according to claim 3, wherein
    a constant radiation area of the light source forms the coverage space of the light source or the space surrounded by the light source.

5. The sound insulation method based on LiFi optical communication according to claim 4, wherein the constant radiation area of the light source is realized in different shapes and different sizes by the light source.

6. The sound insulation method based on LiFi optical communication according to claim 2, wherein zoning the public area and the private area by the light source according to the light source parameter comprises:
    providing a plurality of light sources and zoning the public area and the private area by the light sources according to respective light source parameter of the light sources.

7. The sound insulation method based on LiFi optical communication according to claim 6, wherein the light sources have priorities, and when the light sources corresponding to different zone areas overlap with each other, an overlapping area is zoned according to the priorities of the corresponding light sources.

8. The sound insulation method based on LiFi optical communication according to claim 1, wherein the method further comprises:
  filtering a first private voice data whose sound source position is located in the public area, and the first private voice data whose sound source has an audio intensity less than or equivalent to a first intensity threshold and whose sound source is separated from a voice collection module by a distance greater than or equivalent to a distance threshold.

9. The sound insulation method based on LiFi optical communication according to claim 8, wherein the method further comprises:
  filtering a second private voice data whose sound source position is located in the public area, and the second private voice data whose sound source has an audio intensity less than or equivalent to a second intensity threshold and whose sound source is separated from a voice collection module by a distance less than or equivalent to a distance threshold.

10. The sound insulation method based on LiFi optical communication according to claim 8, wherein before performing voice communication according to the filtered sound sources, the method further comprises:
  collecting a first video data;
  searching for two opposite sound sources whose positions face to each other in the public area according to the first video data; and
  defining the two opposite sound sources face to each other as the first private voice data.

11. A sound insulation device based on LiFi optical communication, wherein the device comprises:
  a zoning module configured to zone a space into a public area and a private area by a light through LiFi optical communication;
  a voice collection module configured to collect one or multiple sound sources;
  a voiceprint recognition module configured to extracting an identified voice data from the sound sources according to a voiceprint feature;
  a positioning module configured to obtain a sound source location of the sound sources according to the identified voice data;
  a filtering module configured to filter a private voice data whose sound source location is located in the private area from the sound sources; and
  a voice communication module configured to perform voice communication according to the filtered sound sources.

12. The sound insulation device based on LiFi optical communication according to claim 11, wherein the device further comprises:
  a LiFi optical communication module configured to transmit the light by a light source and receive a light source parameter represented by a flashing of the light for the zoning module to form the public area and the private area by the light source according to the light source parameter.

13. The sound insulation device based on LiFi optical communication according to claim 12, wherein the zoning module is configured to
  define a coverage space of the light source according to the light source parameter, and to form the public area and the private area by the light source according to the light source parameter; or
  define a space surrounded by the light source according to the light source parameter, and to form the public area and the private area by the light source according to the light source parameter.

14. The sound insulation device based on LiFi optical communication according to claim 13, wherein a constant radiation area of the light source forms the coverage space of the light source or the space surrounded by the light source.

15. The sound insulation device based on LiFi optical communication according to claim 14, wherein the constant radiation area of the light source is realized in different shapes and different sizes by the light source.

16. The sound insulation device based on LiFi optical communication according to claim 11, wherein the filtering module is configured to filter a first private voice data whose sound source position is located in the public area, and the first private voice data whose sound source has an audio intensity less than or equivalent to a first intensity threshold and whose sound source is separated from the voice collection module by a distance greater than or equivalent to a distance threshold.

17. The sound insulation device based on LiFi optical communication according to claim 16, wherein the filtering module is configured to filter a second private voice data whose sound source position is located in the public area, and the second private voice data whose sound source has an audio intensity less than or equivalent to a second intensity threshold and whose sound source is separated from a voice collection module by a distance less than or equivalent to a distance threshold.

18. The sound insulation device based on LiFi optical communication according to claim 16, wherein the device further comprises:
  a video collection module configured to collect a first video data;
  a vision processing module configured to search for two opposite sound sources whose positions face to each other in the public area according to the first video data and define the two opposite sound sources face to each other as the first private voice data.

19. A sound insulation system based on LiFi optical communication, wherein the system comprises:
  the sound insulation device based on the LiFi optical communication according to claim 11, wherein the filtering module is further configured to filter a first private voice data whose sound source position is located in the public area;
  a LiFi optical communication module configured to transmit the light by a light source and receive a light source parameter represented by a flashing of the light for the zoning module to form the public area and the private area by the light source according to the light source parameter;
  a video collection module configured to collect an identified video data; and
  a visual processing module configured to search for two opposite sound sources whose positions face to each other in the public area according to the identified video data and define the two opposite sound sources face to each other as the first private voice data in the public area.

20. The sound insulation system based on LiFi optical communication according to claim 19, wherein the light source is configured to form a coverage space surrounded by the light irradiated on a constant area.

* * * * *